(No Model.)  3 Sheets—Sheet 1.
T. J. BRAY.
MECHANISM FOR THE MANUFACTURE OF ANGULAR TUBES.
No. 382,454. Patented May 8, 1888.
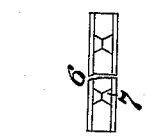
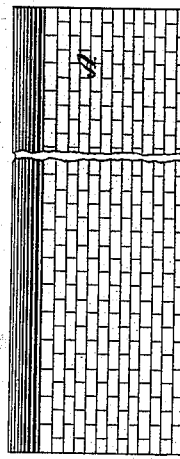
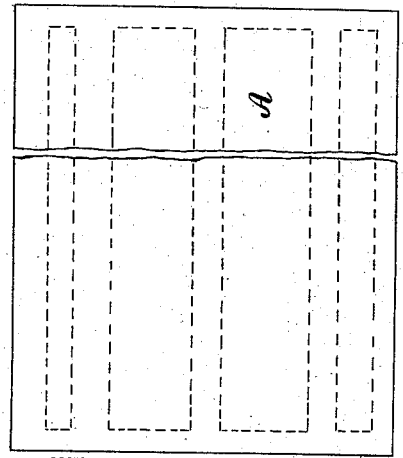
FIG.1.  FIG.2.  FIG.3.
WITNESSES:  INVENTOR, (No Model.) 3 Sheets—Sheet 2.
T. J. BRAY.
MECHANISM FOR THE MANUFACTURE OF ANGULAR TUBES.
No. 382,454. Patented May 8, 1888.
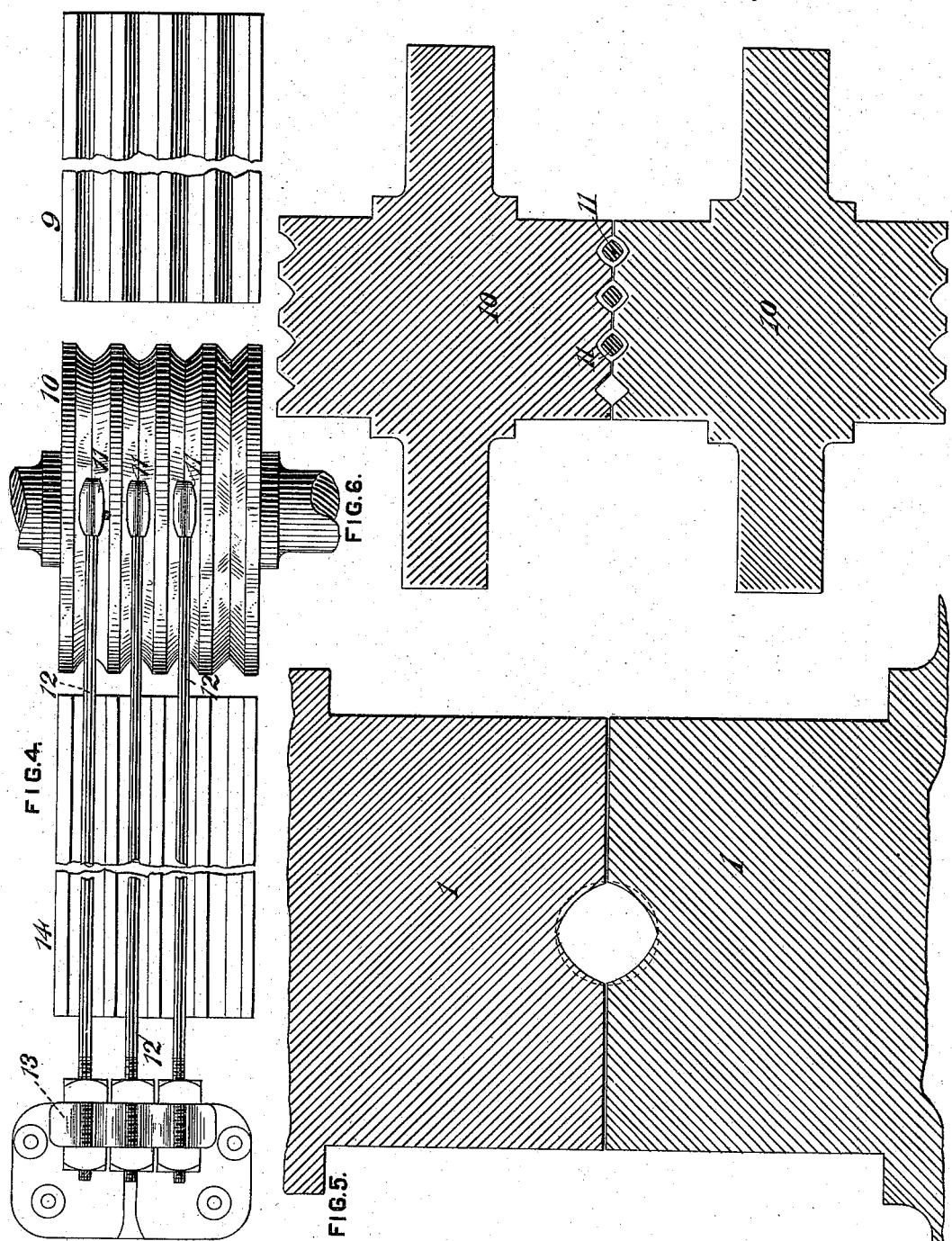

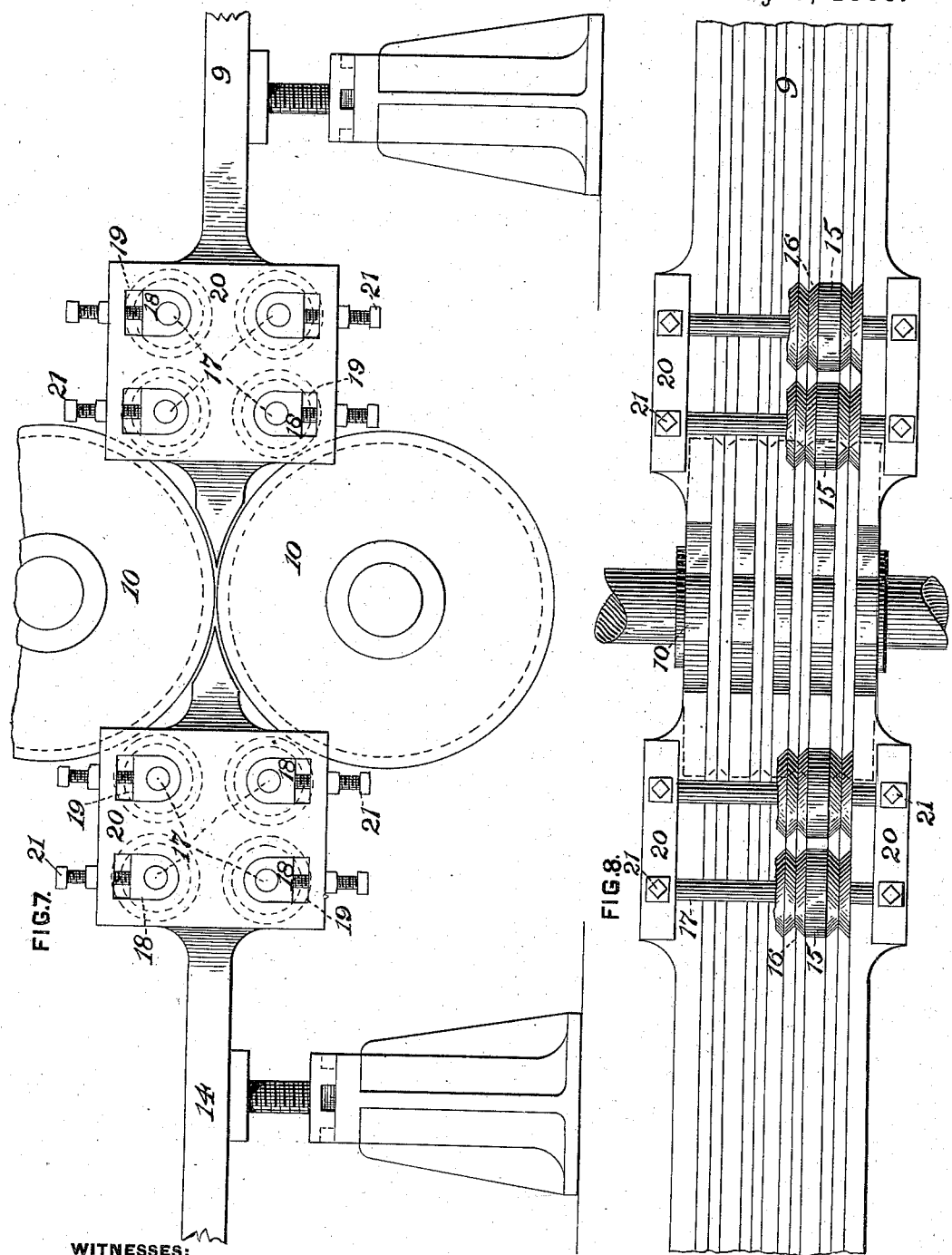

UNITED STATES PATENT OFFICE.

THOMAS J. BRAY, OF WHEELING, WEST VIRGINIA, ASSIGNOR OF ONE-HALF TO THE RIVERSIDE IRON WORKS, OF SAME PLACE.

MECHANISM FOR THE MANUFACTURE OF ANGULAR TUBES.

SPECIFICATION forming part of Letters Patent No. 382,454, dated May 8, 1888.

Application filed February 3, 1888. Serial No. 262,908. (No model.)

*To all whom it may concern:*

Be it known that I, THOMAS J. BRAY, a citizen of the United States, residing at Wheeling, in the county of Ohio and State of West Virginia, have invented or discovered a certain new and useful Improvement in the Manufacture of Angular Tubes, of which improvement the following is a specification.

The invention herein relates to certain improvements in apparatus for the production of pipes or tubes other than circular in cross-section. Among the many methods heretofore resorted to for the production of non-circular pipes or tubes the following are briefly set forth:

First. A pipe or tube circular in cross-section is formed by bell die welding. Then the pipe or tube is reheated and drawn through a succession of dies having a square or approximately square opening, the pipe being reheated between each draw. This operation is slow and laborious, and the scale produced by the numerous reheatings gathers at the mouth of the dies, scratching and scoring the surface of the pipe or tube to such an extent as to render the pipe unsalable.

The second method is very much the same as the above, except that the strip is first bent into a skelp, one half of which is heated, welded, and shaped, and then the other half. The welding and shaping dies in this case are held in tongs, thereby permitting of freeing them from scale. This freedom from scale and consequent avoidance of the scoring of the pipes is practically the only advantage which the method has over the one first set forth.

A third method which may be mentioned consists in forming a circular pipe by any of the usual methods and then passing the pipe through between rolls having grooves constructed to gradually reduce the pipe to the desired shape in cross-section. A large number of passes are required to effect the desired reduction, for the reason that if a heavy draft for rapid reduction be given the sides of the pipe or tube will "cave" or collapse, thereby producing an angular figure having concave sides. Hence in the practice of this method a large number of passes with light draft must be made, thereby necessitating frequent reheatings.

The object of the invention herein is to provide for the production of a pipe or tube approximating the cross-sectional contour desired in the finished article, and then for reduction of such embryonic shape to the desired form.

To these ends the invention consists in the construction and combination of mechanical devices or elements, all as more fully hereinafter described and claimed.

In the accompanying drawings, forming a part of this specification, Figure 1 is a plan view of a pipe-welding plant embodying my invention. Fig. 2 is a view in side elevation of the welding portion of said plant. Fig. 3 is a similar view of the reducing and shaping portion of the plant; and Fig. 4 is a plan view, on an enlarged scale, of the reducing and shaping portion of the plant. Figs. 5 and 6 are views in elevation of the welding and shaping rolls. Figs. 7 and 8 are views in plan and elevation of the reducing and shaping portion of the plant, having straightening-rolls applied thereto.

In the practice of my invention the strip of metal is first bent in any suitable manner into the form of a skelp, which is then placed in a heating-furnace, A. In front of this furnace is placed the welding apparatus, which is in most particulars identical with the usual ball-welding machine, and consists of the grooved welding-rolls 1, the supporting-table 2, provided with a series of grooved friction-rolls, 3, and the stop-head 4, in which the rear end of the mandrel 5 is removably secured. In the rear of the stop-head is arranged a table, 6, provided with a series of grooved rollers, 7, on which the mandrel moves while being withdrawn for a pipe.

In manufacturing square tubes the welding-rolls 1 are formed with gothic-shaped grooves, and the ball 8, over which the welding is effected, is similarly shaped, whereby the resulting pipe is caused to approximate in its cross-sectional contour to the shape desired in the finished tube. In manufacturing tubes of different shapes the grooves of the welding-rolls are so constructed and proportioned as to impart to the tube operated on the desired approximation to the shape to be produced.

After the skelp has been welded and shaped, as above stated, the mandrel is removed from the pipe, which is then transferred to the table 9, arranged in convenient proximity to the table 2. In front of the table are arranged a pair of rolls, 10, having a series of grooves formed therein, said grooves being constructed and proportioned for the progressive reduction of the pipe to the desired cross-sectional contour. In the grooves in the reducing-rolls are arranged the balls 11, which correspond in cross-section to the shape of the grooves in which they are placed. These balls are formed with tapering ends, as shown in Fig. 4, and are held in place midway of the grooves by mandrels 12, having their opposite ends secured in the stop-block 13. Between the rolls and the stop is arranged a table, 14, said table and the table 9 being provided with grooves in their upper faces in line with the grooves in the rolls 10.

The balls 11 are so constructed as regards their size in cross-section that when held in position in the grooves there will be a space between them and the walls of the grooves equal to the thickness of the metal of the pipe.

The welded pipe is placed in the first groove in the table 14, and then pushed into the first groove of the rolls 10, which are revolved so as to draw the pipe through said groove and over the ball 11 located therein. As soon as this pipe has passed through said grooves, the rolls are reversed, and the pipe, being given a quarter-turn on its axis, is pushed back into the same groove. After the pipe has been subjected to the back and forth passes in the groove it is transferred to the next groove of the table 9, and thence fed into the next groove of the rolls 10, said groove being smaller and more closely approximating to the finished form desired. The pipe is subjected to these back and forth passes through successive grooves in the rolls until the desired size and shape has been attained. As the sides of the pipe are supported internally by the balls 11, a very rapid reduction may be made, as there is no danger of the sides being caved or collapsed by the action of the rolls. By reason of this rapid reduction less time and fewer passes are required, and the entire operation of welding and shaping can be effected at one heat, thereby effecting a great saving in time, fuel, and labor.

In order to prevent any bending or twisting of the pipe during the shaping and reducing operation, and to remove any such defects which may have occurred during the welding operation, I provide one, two, or more pairs of straightening-rolls, 15, on each side of the rolls 10, the rolls 15 having grooves 16 formed in their peripheries corresponding in contour and size to the grooves in the rolls 10. The trunnions 17 of the rolls 15 are mounted in boxes 18, arranged in suitable slots, 19, formed in housings or standards 20, which are preferably formed on or secured to beds 9 and 14 in close proximity to the rolls 10. The rolls 15 are adjusted into proper proximity to each other by screws 21, passing through the housings and engaging the journal-boxes 18.

The grooves in the welding-rolls and the first of the series of grooves in the reducing-rolls when manufacturing flat-sided polygonal tubes have their walls formed in arcs of circles of greater radii than the radius of the circle circumscribing said grooves, and the radii of the circles on the walls of the succeeding grooves of the reducing-rolls are gradually increased in length, such increase being proportioned, or approximately so, to the amount of reduction to be effected.

Although I prefer to construct the walls of the grooves of the rolls on arcs of circles, as above stated, for the reason that there is less liability of causing the walls of the tube to collapse, said walls may be made nearly or quite flat or plane—i. e., formed on arcs of circles whose radii are infinite—and hence in the terms employed to characterize the construction or shape of grooves I do not limit myself to any specific degree of curvature, as the same may in the welding-roll, and in the reducing-rolls does, vary from an arc of a comparatively short radius to one of an infinitely long radius.

I claim herein as my invention—

1. In a plant for manufacturing polygonal tubes, a pair of welding-rolls having grooves formed therein, said grooves having their walls formed on arcs of circles of greater radii than the radius of the circumscribed circle, in combination with a welding-ball having a cross-sectional shape corresponding to the opening formed by the grooves of the welding-rolls, substantially as set forth.

2. In a plant for the manufacture of polygonal tubes, a pair of reversible reducing-rolls having a groove formed therein, said groove having its walls formed on arcs of circles of greater radii than the radius of the circumscribed circle, in combination with a ball or mandrel having a cross-sectional shape corresponding to the opening formed by the grooves in the rolls and tapering from the middle to its ends, substantially as set forth.

3. In a plant for the manufacture of polygonal tubes, a pair of reversible reducing-rolls having a groove formed therein, said groove having its walls formed on arcs of circles of greater radii than the radius of the circumscribed circle, in combination with a ball or mandrel having a cross-sectional shape corresponding to the opening formed by the grooves in the rolls and tapering from the middle to its ends, and one or more pairs of straightening-rolls grooved to correspond with the reducing-rolls and arranged on each side of the reducing-rolls, substantially as set forth.

4. In a plant for the manufacture of polygonal tubes, a pair of reversible reducing-rolls having a series of grooves formed therein, the first of said series having its walls formed on arcs of circles of greater radii than the radius of the circumscribed circle, and the walls of each succeeding groove approximating more and more closely to plane surfaces so arranged as to form an opening or pass corresponding to the shape desired, in combination with a series of balls or mandrels tapering from their centers to their ends and shaped in cross-section to correspond to the openings formed by the grooves in the rolls, substantially as set forth.

In testimony whereof I have hereunto set my hand.

THOMAS J. BRAY.

Witnesses:
DARWIN S. WOLCOTT,
R. H. WHITTLESEY.